United States Patent
Russell et al.

(10) Patent No.: US 11,861,412 B2
(45) Date of Patent: Jan. 2, 2024

(54) METHOD FOR CONSOLIDATING INFRASTRUCTURE DEPLOYMENT INCLUDING NETWORKING, OUT-OF-BAND MANAGEMENT, AND IN-BAND MANAGEMENT THROUGH A WEB GRAPHICAL USER INTERFACE

(71) Applicant: EMC IP Holding Company LLC, Hopkinton, MA (US)

(72) Inventors: Deborah C. Russell, Arvada, CO (US); Donald E. Mace, Hopkinton, MA (US); Mark Alan Herring, Pflugerville, TX (US); Peder Brooks Piggot, Pflugerville, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 250 days.

(21) Appl. No.: 17/117,014

(22) Filed: Dec. 9, 2020

(65) Prior Publication Data

US 2022/0179716 A1 Jun. 9, 2022

(51) Int. Cl.
*G06F 9/455* (2018.01)
*G06F 9/50* (2006.01)

(52) U.S. Cl.
CPC ........ *G06F 9/5077* (2013.01); *G06F 9/45558* (2013.01); *G06F 2009/45595* (2013.01)

(58) Field of Classification Search
CPC .................................................. G06F 9/45558
USPC ............................................................ 718/1
See application file for complete search history.

(56) References Cited

U.S. PATENT DOCUMENTS

| | | | |
|---|---|---|---|
| 9,690,614 B1* | 6/2017 | Sandham | G06F 8/61 |
| 9,858,166 B1* | 1/2018 | Gong | G06F 8/443 |
| 9,928,097 B1* | 3/2018 | Krottapalli | G06F 8/65 |
| 10,057,138 B1* | 8/2018 | Cox | G06F 3/04842 |
| 10,091,295 B1* | 10/2018 | Savic | G06F 16/25 |
| 10,778,520 B2* | 9/2020 | Patel | G06F 11/3409 |
| 10,782,996 B2* | 9/2020 | Riewrangboonya | G06F 9/45558 |
| 11,175,944 B2* | 11/2021 | Hogan | G06F 9/45558 |
| 11,218,361 B2* | 1/2022 | Dolinsky | H04L 41/0803 |
| 2002/0188861 A1* | 12/2002 | Townsend | G06F 21/577 726/25 |
| 2013/0067456 A1* | 3/2013 | Khilnani | G06Q 10/067 717/174 |

(Continued)

*Primary Examiner* — Mehran Kamran
(74) *Attorney, Agent, or Firm* — Chamberlain, Hrdlicka, White, Williams & Aughtry

(57) ABSTRACT

Techniques are described herein are related to managing deployment of a converged infrastructure (CI). Such techniques may include receiving a request to initiate a CI deployment; obtaining a CI information set; creating a CI deployment file using the CI information set; rendering a deployment user interface (UI) screen that allows a user to select to configure network devices or a CI cluster; receiving a first selection to configure a network device; rendering network device configuration screens to obtain network device configuration information; adding the network device configuration information to the CI deployment file; receiving a second selection to configure the CI cluster; rendering CI cluster configuration screens to obtain CI cluster configuration information; adding the CI cluster configuration information to the CI deployment file; and deploying the CI using the CI deployment file.

20 Claims, 4 Drawing Sheets

(56) References Cited

U.S. PATENT DOCUMENTS

| | | | | |
|---|---|---|---|---|
| 2015/0186175 A1* | 7/2015 | Van Der Walt | ......... | H04L 67/10 |
| | | | | 718/1 |
| 2015/0188775 A1* | 7/2015 | Van Der Walt | ......... | H04L 41/40 |
| | | | | 715/734 |
| 2017/0270060 A1* | 9/2017 | Gupta | ................. | G06F 13/4068 |
| 2017/0272335 A1* | 9/2017 | Hamlin | ............... | H04L 41/5045 |
| 2017/0344388 A1* | 11/2017 | Ramos da Rocha | . | G06F 9/5011 |
| 2018/0048712 A1* | 2/2018 | Sarisky | ................. | G06F 3/0631 |
| 2018/0302475 A1* | 10/2018 | Sarisky | ................. | G06F 3/0619 |
| 2019/0020545 A1* | 1/2019 | Washenko | ............... | H04L 67/34 |
| 2019/0213104 A1* | 7/2019 | Qadri | ................. | G06F 11/3608 |
| 2020/0004570 A1* | 1/2020 | Glade | ................... | G06F 9/5077 |
| 2020/0183724 A1* | 6/2020 | Shevade | ............ | G06F 9/45558 |
| 2020/0218561 A1* | 7/2020 | Lal | ...................... | H04L 67/1008 |
| 2021/0092182 A1* | 3/2021 | Liguori | .................. | H04L 67/34 |
| 2021/0111951 A1* | 4/2021 | Ali | ...................... | G06F 9/45558 |
| 2021/0203545 A1* | 7/2021 | Roberts, Jr. | ......... | H04M 3/5183 |
| 2021/0392038 A1* | 12/2021 | Zhang | ................. | G06F 9/45558 |
| 2022/0179555 A1* | 6/2022 | Hogan | ................. | G06F 16/122 |
| 2022/0210226 A1* | 6/2022 | Nijhawan | ........... | H04L 67/1097 |
| 2022/0417182 A1* | 12/2022 | Lochhead | ............... | H04L 41/12 |

* cited by examiner

METHOD FOR CONSOLIDATING INFRASTRUCTURE DEPLOYMENT INCLUDING NETWORKING, OUT-OF-BAND MANAGEMENT, AND IN-BAND MANAGEMENT THROUGH A WEB GRAPHICAL USER INTERFACE

BACKGROUND

Computing devices (e.g., servers, network devices, etc.) are often used to perform various workloads. In certain scenarios, it may be advantageous to combine the various computing resources (e.g., processors, storage, networking, etc.) of such computing devices into a converged infrastructure. However, deploying a converged infrastructure is often time consuming and prone to error, including steps such as planning, physical device installation, network configuration, etc. before the actual converged infrastructure deployment can begin.

SUMMARY

In general, embodiments described herein relate to a method for managing deployment of a converged infrastructure. The method may include receiving a request to initiate a converged infrastructure (CI) deployment; obtaining, in response to the request, a CI information set; creating a CI deployment file using the CI information set; rendering a deployment user interface (UI) screen comprising a first UI selection mechanism for configuring a network device and a second UI selection mechanism for configuring a CI cluster; receiving a first selection via the first UI selection mechanism to configure the network device; rendering, in response to the first selection, a plurality of network device configuration screens to obtain network device configuration information; adding the network device configuration information to the CI deployment file; rendering the deployment UI screen comprising the first UI selection mechanism and the second UI selection mechanism; receiving a second selection via the second UI selection mechanism to configure the CI cluster; rendering a plurality of CI cluster configuration screens to obtain CI cluster configuration information; adding the CI cluster configuration information to the CI deployment file; and deploying the CI using the CI deployment file.

In general, embodiments described herein relate to a non-transitory computer readable medium that includes computer readable program code, which when executed by a computer processor enables the computer processor to perform a method for managing deployment of a converged infrastructure. The method may include receiving a request to initiate a converged infrastructure (CI) deployment; obtaining, in response to the request, a CI information set; creating a CI deployment file using the CI information set; rendering a deployment user interface (UI) screen comprising a first UI selection mechanism for configuring a network device and a second UI selection mechanism for configuring a CI cluster; receiving a first selection via the first UI selection mechanism to configure the network device; rendering, in response to the first selection, a plurality of network device configuration screens to obtain network device configuration information; adding the network device configuration information to the CI deployment file; rendering the deployment UI screen comprising the first UI selection mechanism and the second UI selection mechanism; receiving a second selection via the second UI selection mechanism to configure the CI cluster; rendering a plurality of CI cluster configuration screens to obtain CI cluster configuration information; adding the CI cluster configuration information to the CI deployment file; and deploying the CI using the CI deployment file.

In general, embodiments described herein relate to a system for managing deployment of a converged infrastructure. The system may include a converged infrastructure (CI) node operatively connected to a network device and a CI deployment client device, and including a processor, memory, a storage device. The system may also include a deployment wizard, executing on the CI node, and configured to receive, from the CI deployment client device, a request to initiate a converged infrastructure (CI) deployment; obtain, in response to the request, a CI information set; create a CI deployment file using the CI information set; render a deployment user interface (UI) screen comprising a first UI selection mechanism for configuring a network device and a second UI selection mechanism for configuring a CI cluster; receive a first selection via the first UI selection mechanism to configure the network device; render, in response to the first selection, a plurality of network device configuration screens to obtain network device configuration information; add the network device configuration information to the CI deployment file; render the deployment UI screen comprising the first UI selection mechanism and the second UI selection mechanism; receive a second selection via the second UI selection mechanism to configure the CI cluster; render a plurality of CI cluster configuration screens to obtain CI cluster configuration information; add the CI cluster configuration information to the CI deployment file; and deploy the CI using the CI deployment file.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
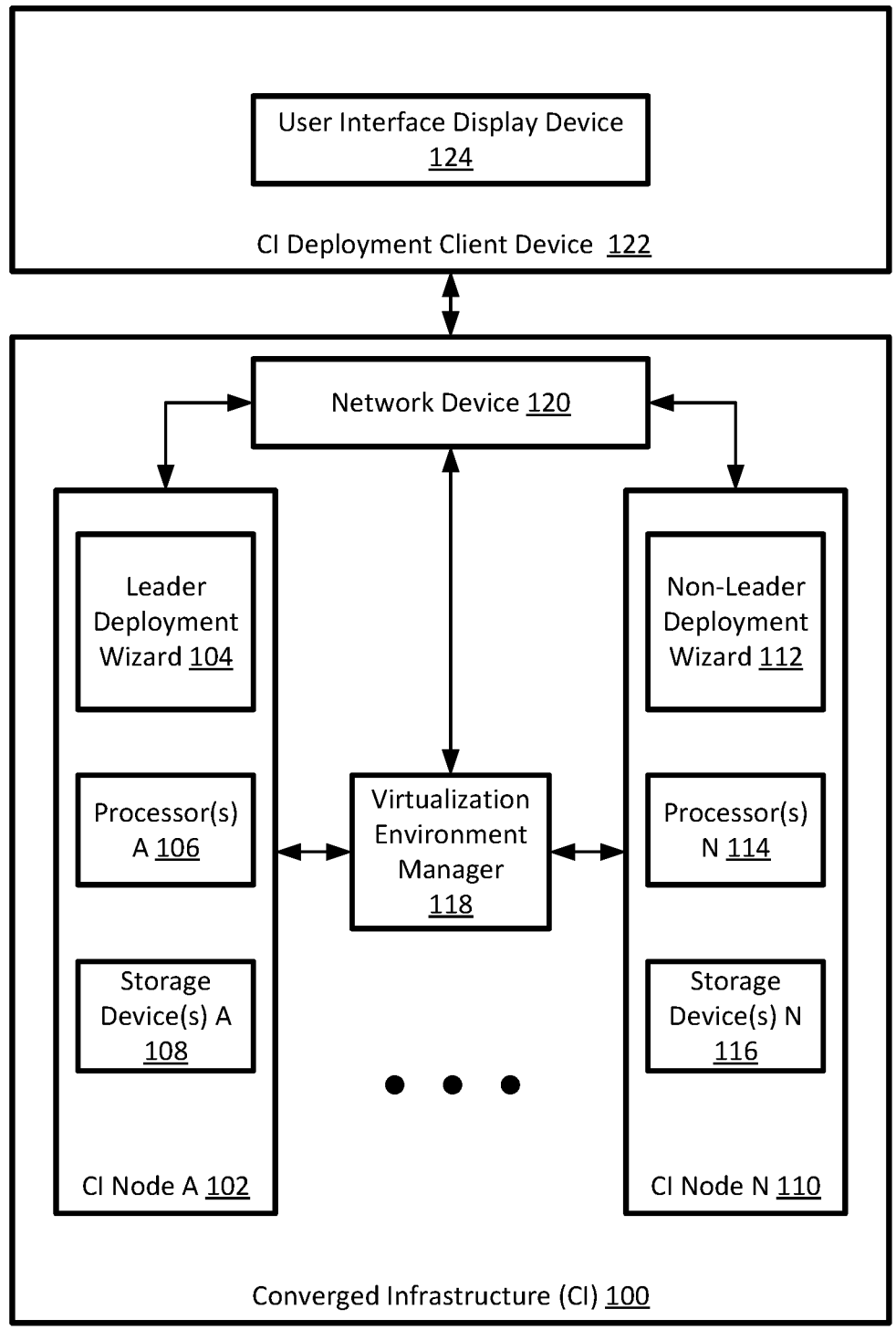
FIG. 1 shows a diagram of a system in accordance with one or more embodiments of the invention.

Specific embodiments will now be described with reference to the accompanying figures.

In the below description, numerous details are set forth as examples of embodiments described herein. It will be understood by those skilled in the art, that have the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for configuring a converged infrastructure (CI) that includes any number of CI nodes (e.g., server computing devices) and any number of network devices using a single user interface. As used herein, the term converged infrastructure, or CI, should be understood to mean any type of converged infrastructure, including, by way of example, hyper-converged infrastructure (HCI), that includes computing resources such as computing devices/nodes and network devices.

Prior to embodiments described herein, configuring a converged infrastructure with virtualized CI nodes included, at least, configuring a virtualization environment manager (e.g., vCenter from VMware), configuring all network devices (e.g., enabling ports, enabling communication protocols, assigning Internet Protocol (IP) addresses, configuring virtual local area networks (VLANs), etc.), and configuring a client computing device from which to perform the deployment steps. All of the aforementioned steps, and others, must be performed before any CI nodes can be deployed to have a complete CI. Additionally, other tasks, such as, for example, configuring out-of-band (OOB) management, has to be performed for each node separately. Such steps require using a multitude of disparate graphical user interfaces (UIs), command line interfaces (CLIs), etc.

Embodiments described herein help mitigate the complexity of CI deployment, which may reduce the time to deploy a CI and/or reduce the number of potential errors that may occur during CI deployment. In one or more embodiments, a single UI is presented which allows users to configure network devices, CI cluster nodes, OOB management for the CI nodes, virtualization environment managers, and in-band management in order to fully deploy a CI solution.

In one or more embodiments, a user is presented a rendered UI screen from a deployment wizard executing on a CI cluster node on the user's client device that allows the user to select to configure network devices or a CI cluster that includes any number of CI nodes. In one or more embodiments, network devices must be configured prior to configuration of a CI cluster. If network devices have already been configured, a user may select to configure the CI cluster, otherwise the user will select to configure the network devices.

In one or more embodiments, if the network is to be configured via the deployment wizard, the user is presented a series of rendered UI screens on the user's client device so that the deployment wizard may obtain necessary network device configuration information. Such screens may include a screen to select step-by-step set up or import settings from a network configuration file (e.g., a JavaScript Open Notation (JSON) file created using a pre-engagement questionnaire (PEQ)). In one or more embodiments, if the user selects step-by-step, some or all of the fields on subsequent screens may be populated with suggested entries, which the user may choose to accept or override. In one or more embodiments, if the user selects to import network device configuration information from a network device configuration information file, information from that file will be used to populate at least some of the fields in subsequent screens, which the user may view and choose to accept or override. Other UI screens rendered during the network device configuration workflow may include screens listing discovered network devices and/or ports of such network devices connected to CI nodes, virtual local area network (VLAN) configuration screens, a summary screen, and a screen allowing the user to add network information to a CI deployment file (e.g., a JSON file to be used by an application programming interface (API) to perform the cluster deployment).

In one or more embodiments, once the configuration of the network devices has been completed and/or added to the CI deployment file, the deployment wizard renders a screen allowing the user to select to proceed with CI cluster deployment. Once the user selects to proceed with CI cluster deployment, in one or more embodiments, the user is presented a series of rendered UI screens on the user's client device so that the deployment wizard may obtain necessary CI cluster configuration information. Such screens may include, but are not limited to, a screen to select step-by-step set up or import settings from a CI cluster configuration file (e.g., a JSON file created using a (PEQ)). In one or more embodiments, if the user selects step-by-step, some or all of the fields on subsequent screens may populated with suggested entries, which the user may choose to accept or override. In one or more embodiments, if the user selects to import CI cluster configuration information from a CI cluster configuration information file, information from that file will be used to populate at least some of the fields in subsequent screens, which the user may view and choose to accept or override. Other UI screens rendered during the CI cluster configuration workflow may include screens listing discovered CI nodes, virtualization environment manager configuration screen(s), a summary screen, and a screen allowing the user to add CI cluster information to a CI deployment file (e.g., a JSON file to be used by an API to perform the cluster deployment).

In one or more embodiments, once the network device configuration and CI cluster configuration are complete, the CI deployment file created by the deployment wizard is used to deploy the CI. In one or more embodiments, the configuration of the network devices includes configuration of only ports connected to CI nodes and/or that are otherwise not connected to other devices. As such, the network devices used for the CI may have at least some ports connected to other devices for other purposes, and the CI deployment described herein will not affect those ports.

FIG. 1 shows a diagram of a system in accordance with one or more embodiments described herein. The system may include a converged infrastructure (CI) (100). The CI (100) may include a virtualization environment manager (118) and any number of CI nodes (e.g., CI node A (102), CI node N (110)). CI node A (102) may include a leader deployment wizard (104), processor(s) (106), and storage device(s) (108). CI node N (110) may include a non-leader deployment wizard (112), processor(s) (114), and storage device(s) (116). The system may also include a CI deployment client device (122). The CI deployment client device (122) may include a user interface display device (124). Each of these components is described below.

In one or more embodiments, CI (100) is a collection of operatively connected devices configured to function together to perform computing tasks using combined resources. One non-limiting example of a CI (100) is a HCI, in which some or all of the computing resources (e.g., processing, storage, networking) may be software-defined, such that underlying hardware resources may be provisioned as needed for whatever workloads are to be performed on the HCI. In one or more embodiments, software-defined computing resources may include a virtualization layer existing above the physical hardware layer that provides the computing resources of CI (100) to higher layers, such as virtual machines, operating systems, applications, workloads, containers, etc. In one or more embodiments, CI (100) is a HCI, with the CI nodes sharing processing resources and storage and being commonly connected to one or more network devices of CI (100). In one or more embodiments, CI (100) is all or any portion of a data center. CI (100) may include any number of CI nodes, any number of network devices, and one or more virtualization environment managers, each of which is discussed further, below. One of ordinary skill in the art having the benefit of this Detailed Description will appreciate that CI (100) may include any number of other components and/or devices without departing from the scope of embodiments described herein.

In one or more embodiments, the CI nodes (102, 110) are computing devices of any type located in a common virtualization environment, such as, for example, CI (100). In one or more embodiments, a virtualization environment is any environment in which any number of computing devices, such as CI node A (102) and CI node N (110), are subject, at least in part, to a shared scheme for pooling compute resources (e.g., processors, storage devices, etc.) for use in deploying virtualized computing device instances (e.g., virtual machines (VMs), containers, virtual appliances, emulators, etc.).

In one or more embodiments, the CI nodes (e.g., 102, 110) within the CI (100) may be any single computing device, collection of computing devices, portion of one or more computing devices, or any other grouping of computing resources (e.g., portions of a hyper-converged infrastructure).

In one or more embodiments, a computing device is any device, portion of a device, or any set of devices capable of electronically processing instructions and may include any number of components, which may include, but are not limited to, any of the following: one or more processors (e.g. components that include integrated circuitry) (106, 114), memory (e.g., random access memory (RAM)) (not shown), input and output device(s) (not shown), non-volatile storage device(s) (e.g., solid-state drives (SSDs), hard disk drives (HDDs)) (108, 116), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), and/or any other type of computing device with the aforementioned requirements.

In one or more embodiments, any or all of the aforementioned examples may be used or combined to create a system of such devices, which may collectively be referred to as a CI node (102, 110). Other types of computing devices may be used without departing from the scope of the embodiments described herein.

In one or more embodiments, one or more CI nodes (102, 110) within CI (100) may be grouped together to form a CI cluster. In one or more embodiments, a CI cluster is a set of CI nodes configured to function together and share various resources to implement, at least in part, a virtualization environment. In one or more embodiments, a CI cluster may include all CI nodes (102, 110) in CI (100) or any portion thereof. CI (100) may include any number of CI clusters of one or more CI nodes (102, 110) without departing from the scope of embodiments described herein.

In one or more embodiments, the storage devices (108, 116) and/or memory (not shown) of a computing device or system of computing devices may be one or more data repositories for storing any number of data structures storing any amount or type of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any storage device (108, 116) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors (106, 114) and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device (108, 116), diskette, tape storage, flash storage, physical memory, or any other non-transitory computer readable medium.

In one or more embodiments, a CI node (102, 110) includes a hypervisor (not shown), which may also be referred to as a virtual machine monitor. In one or more embodiments, a hypervisor is any hardware (e.g., circuitry), software, firmware, or any combination thereof that includes functionality to manage the underlying hardware resources of a CI node (102, 110), and to make the hardware resources available for use by VMs, which execute on the hypervisor. Thus, the hypervisor abstracts the underlying hardware from the VMs.

In one or more embodiments, the hypervisor receives instructions from VMs (not shown) and performs the instructions using the appropriate underlying hardware (e.g., processor(s), storage, networking components, etc.). Such instructions from a VM may be altered by the hypervisor into a form appropriate for the underlying hardware. For example, the operating system of a VM may seek to execute instructions for a particular processor type, and the hypervisor may translate the instructions to a form that the actual underlying hardware processors can process. Additionally or alternatively, certain instructions from a VM may be passed through a hypervisor for execution using the underlying hardware without modification. A hypervisor may function as a hardware scheduler that schedules when instructions from various VMs will be executed on underlying hardware. For example, many VMs, each with virtual processors allocated, may require that the hypervisor schedule when the underlying hardware processors will be used to execute instructions for the VMs. Hypervisors may perform any other functions (e.g., provide virtual network components, virtual storage components, etc.) without departing from the scope of embodiments described herein.

In one or more embodiments, a VM (not shown) is an emulation of a computing device (described above), or any portion thereof, that is abstracted from the underlying hardware of a CI node (102, 110) that hosts the VM. In one or more embodiments, a VM may include functionality to perform any of the functionality of a physical computing device. For example, a VM may include an operating system in which any number of software applications exist and execute. As another example, a VM may be packaged as a virtual appliance configured to perform one or more workloads when deployed.

In one or more embodiments, one or more CI nodes (102, 110) also include a deployment wizard (e.g., leader deployment wizard (104), non-leader deployment wizard (112)). In one or more embodiments, a deployment wizard (104, 112) is any hardware (e.g., circuitry), software, firmware, or any combination thereof that includes functionality to be accessed by a client device (discussed further, below), to render UI screens and perform other actions to obtain information related to CI (100) to create a CI deployment file, and to use the CI deployment file (e.g. via one or more APIs) to deploy a CI (100). In one or more embodiments, deploying a CI (100) includes, but is not limited to, configuring, at least in part, a CI cluster using the CI nodes (102, 104), any number of network devices (120) within CI (100), a virtualization environment manager, and/or OOB functionality for the CI nodes (102, 110).

In one or more embodiments, one CI node (e.g., 102) among a set of CI nodes (102, 104) that are to be part of a CI cluster (discussed above) is selected to be a leader using any scheme for selecting one device from a set of devices. In one or more embodiments, the leader CI node (102) includes the leader deployment wizard (104), while other CI nodes (e.g., 110) include non-leader deployment wizards (e.g., 112). Each CI node (104) having a deployment wizard (104, 112) gives each CI node the potential to be the leader from the perspective of a deployment wizard. However, practically, only the leader deployment wizard (104) will be accessed at a given time and used to deploy CI (100). In one or more embodiments, each deployment wizard (104, 112) has the same IP address, but a client device (discussed further, below) accessing that IP address will only be accessing the leader deployment wizard (104) on the CI node (102) that was elected as leader for a given CI cluster.

In one or more embodiments, a CI (100) also includes a virtualization environment manager (118). In one or more embodiments, the virtualization environment manager (118) is operatively connected to the CI nodes (102, 110) of the CI (100) and to network devices (e.g., network device 120) of the CI (100). In one or more embodiments, a virtualization environment manager (118) is a computing device (described above) and/or a VM. FIG. 1 shows the virtualization environment manager (118) within CI (100) and external to the CI nodes (102, 110). However, one having ordinary skill in the art will appreciate that the virtualization environment manager may alternately execute on one of the CI nodes (102, 110), or be external to and operatively connected to CI (100).

In one or more embodiments, a virtualization environment manager (118) provides a user interface for one or more entities for managing the virtualization environment. As such, the virtualization environment manager (118) is operatively connected to the CI nodes (102, 110) and network device(s) (120) of the virtualization environment, and therefore has access to information related to the CI nodes (102, 110) and to the VMs executing on the CI nodes (102, 110), as well as any other computing devices (e.g., storage devices, network devices, etc.) within the virtualization environment. In one or more embodiments, a virtualization environment manager (118) allows entities to view information about the computing devices and VMs of a virtualization environment, to modify aspects of the configuration of such devices and VMs, to deploy or remove VMs on the CI nodes (102, 110), to configure networking and storage for the VMs, or to perform any other task(s) relevant to managing a virtualization environment deployed within the CI (100).

In one or more embodiments, CI (100) includes at least one network device (120). In one or more embodiments, a network device (120) is a physical device that includes and/or is operatively connected to persistent storage (not shown), memory (e.g., random access memory (RAM)) (not shown), one or more processor(s) (e.g., integrated circuits) (not shown), and any number of physical network interface(s) (not shown), which may also be referred to as ports. Examples of a network device include, but are not limited to, a network switch, a router, a multilayer switch, etc. A network device (120) is not limited to the aforementioned specific examples.

In one or more embodiments, a network device (120) also includes any number of additional components, such as, for example, network chips (not shown), field programmable gate arrays (FPGAs) (not shown), application specific integrated circuits (ASICs) (not shown), indicator lights (not shown), fans (not shown), clocks (not shown), etc.

In one or more embodiments, a network device (120) includes any software configured to perform various functions of the network device. Such software may, for example, execute using one or more processors (including circuitry therein) of a network device, or any other hardware resource of a network device capable of executing software. One example of such software is an operating system (OS) (not shown). In one or more embodiments disclosed herein, an OS includes any software and/or firmware for managing the resources (e.g., hardware, other software, etc.) of one or more network devices.

In one or more embodiments, a network device includes functionality to send and/or receive packets (or other network traffic data, such as, e.g., frames, etc.) at any of the physical network interfaces (i.e., ports) of the network device and to process the packets. In one or more embodiments, processing a packet includes, but is not limited to, a series of one or more table lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples of packet processing include, but are not limited to, performing a lookup to determine: (i) whether to take a security action (e.g., drop the network traffic data unit); (ii) whether to mirror the network traffic data unit; and/or (iii) how to route/forward the packet in order to transmit the packet from an interface of the network device (120).

In one or more embodiments, the network device (120) is part of (e.g., operatively connected to) a network (not shown). A network (not shown) may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. A network may be located at a single physical location, or be distributed at any number of physical sites.

In one or more embodiments, a network may be coupled with or overlap, at least in part, with the Internet. In one or more embodiments, a network includes a collection of one or more network devices that facilitate network connectivity for one or more operatively connected devices (e.g., the CI nodes (102, 110) of CI (100)). In one or more embodiments, the network devices and other devices within the network are arranged in a network topology (not shown). In one or more embodiments, a network topology is an arrangement of various devices of a network.

Although FIG. 1 shows a single network device (120) within CI (100), there may be any number of network devices in a CI (100). For example, having two or more network devices creates redundancy that is not available with a single network device, and, as such, may be desirable. In one or more embodiments, only certain ports of network device (120) are operatively connected to CI nodes within the CI, while other ports are operatively connected to other devices for purposes that may or may not be related to the CI (100). Accordingly, when a deployment wizard (104) is used to configure the network device(s), only the ports connected to devices within the CI (and, optionally, ports with no connection) should be configured, while ports connected to the other devices should not be affected. In one or more embodiments, the deployment wizard is configured to identify the ports that should be configured for the CI and to exclude from configuration ports that are connected to other devices. In one or more embodiments, configuring ports on a network device for a CI includes pushing out a CI profile to the network devices, which may, among other things, create a unified fabric among network device ports configured with such a profile.

In one or more embodiments, the system also includes a CI deployment client device (122). In one or more embodiments, the CI deployment client device (122) is a computing device (described above). In one or more embodiments, the CI deployment client device (122) is operatively connected to CI (100) (e.g., via a network of which network device (120) is a part).

In one or more embodiments, the CI deployment client device (122) includes functionality to access a leader deployment wizard (104) (discussed above). In one or more embodiments, a CI deployment client device (122) is operated by a user seeking to deploy a CI (100). In one or more embodiments, the CI deployment client device (122) includes a user interface display device (124). In one or more embodiments, a user interface display device (124) is any hardware (e.g., circuitry), software, firmware, or any combination thereof of the CI deployment client device (122) that includes functionality to display a UI to a user when deploying a CI (100). As an example, the user interface display device (124) may be a browser application executing within an operating system of a CI deployment client device. In one or more embodiments, a user uses the user interface display device (124) to access the leader deployment wizard (104) of a CI node (102) using an IP address of the leader deployment wizard (104).

In one or more embodiments, the user interface display device renders user interface screens for a user using information obtained from a leader deployment wizard (104). In one or more embodiments, the UI screens are presented to the user in a sequential manner based on selections made by a user during a CI deployment. In one or more embodiments, there may be various paths of sequential UI screens after a given UI screen presents the user with two or more choices from amongst which the user selects one. For example, a certain UI screen may request that a user select to configure either networking for a CI (100) or a CI cluster for the CI (100). In one or more embodiments, if no networking has yet been configured for the CI (100), a user chooses to configure networking first in order to properly deploy a CI (100), and is then presented with a series of UI screens for configuring various aspects of a network and network devices for the CI (100). In one or more embodiments, once the networking for a CI (100) is configured, either using the deployment wizard (104) or by being previously otherwise configured, the deployment wizard may return to the UI screen that allows the user to select to configure the CI cluster, and, after CI cluster configuration is selected, the user is presented with various UI screens to configure various aspects of a CI cluster (e.g., the CI nodes, a virtualization environment manager, OOB management functionality, etc.) In one or more embodiments, the workflow embodied by the various UI screens may be progressed through in any logical order that is capable of leading to a successful deployment of a CI (100). The CI deployment process using a leader deployment wizard accessed via a user interface display device of a CI deployment client device is discussed further in the descriptions of FIG. 2A and FIG. 2B, below.

While FIG. 1A shows a configuration of components, other configurations may be used without departing from the scope of embodiments described herein. For example, there may be any number of CI nodes within a CI. As another example, there may be any number of network devices within a CI. As another example, the virtualization environment manager may execute on one of the CI nodes. As another example, the virtualization environment manager may exist external to and operatively connected to the CI, and may or may not be managing any number of additional virtualization environments other than the virtualization environment deployed within the CI. Accordingly, embodiments disclosed herein should not be limited to the configuration of components shown in FIG. 1A.

Figure 2A:
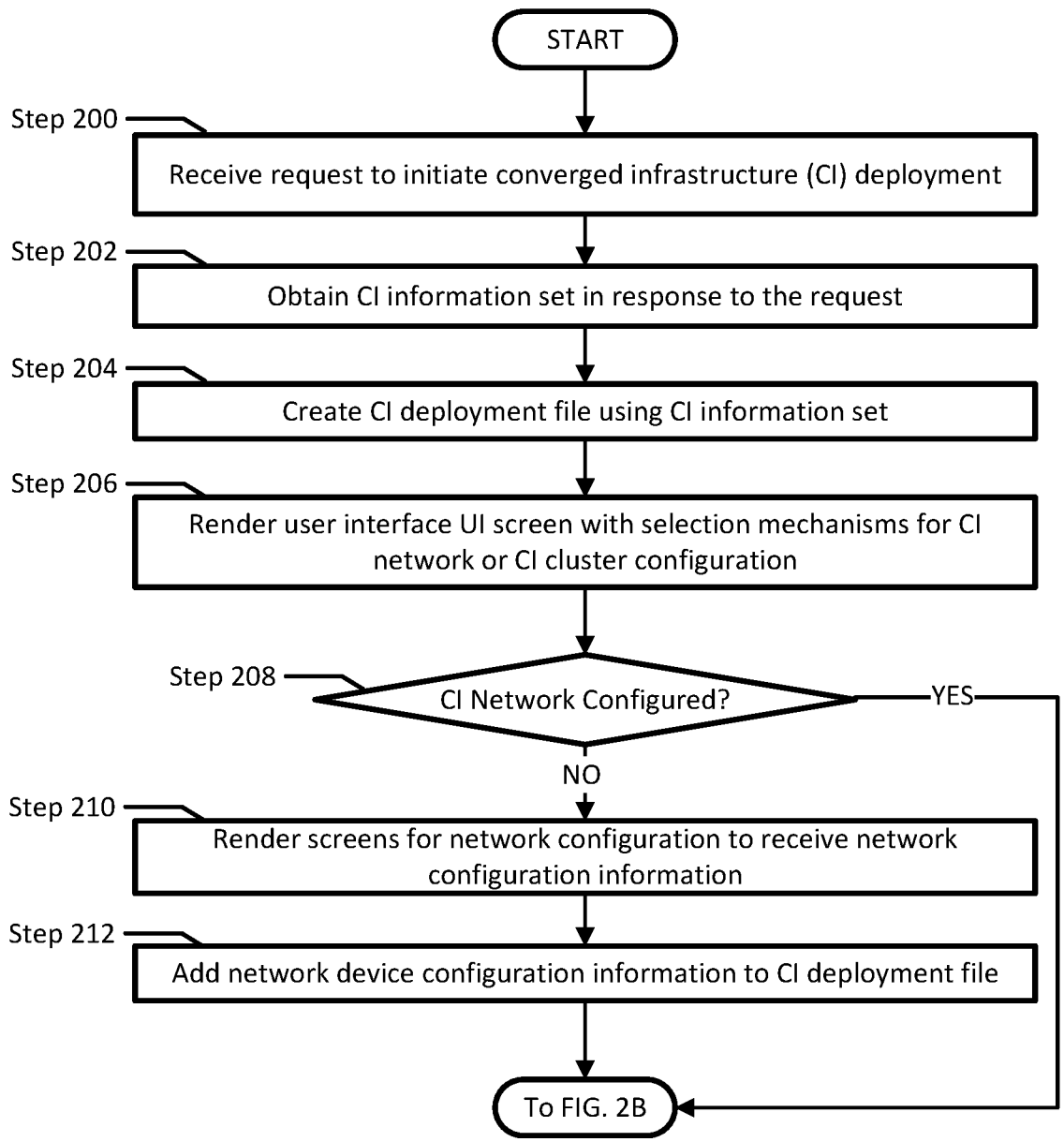
FIG. 2A shows a flowchart in accordance with one or more embodiments of the invention.

FIG. 2A shows a flowchart describing a method for converged infrastructure (CI) deployment in accordance with one or more embodiments disclosed herein.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, a request is received to initiate a CI deployment. In one or more embodiments, the request is received by a user using a client device to access an IP address of a leader deployment wizard on a CI node. For example, a user of a client device may open a browser on the client device and enter the IP address of the deployment wizard into the address bar of the browser.

In Step 202, in response to receiving the request in Step 200, the deployment wizard initiates a back-end discovery process to discover all relevant hardware details for devices (e.g., CI nodes, network devices, etc.) that are to be part of the CI being deployed. As an example, hypertext transfer protocol (HTTP) requests may be sent to the various devices seeking responses with at least a portion of the requested information. As another example, API calls may be used to obtain at least a portion of the information. Information that may be obtained as part of the discovery process may include, but is not limited to, CI node model names, CI node identifiers (e.g., service tags, serial numbers, etc.), CI node details (e.g., network components, storage components, storage capacity, ports and port identifiers, hypervisor information, etc.), network device information (e.g., network device model, network device identifiers, any configured VLANs, etc.), which network device ports are connected to CI nodes, any pre-existing network device configuration, etc.

In Step 204, the deployment wizard creates a CI deployment file using the CI information set obtained in Step 202. In one or more embodiments, a CI deployment file is any one or more files of any type that will later be used to perform the deployment of the CI. In one or more embodiments, the CI deployment file created in Step 204 is only partially complete, and subsequent steps will add additional information to the CI deployment file to complete it prior to deployment of the CI. As an example, a CI deployment file may be a JSON file designed to be used with an API to perform the deployment.

In Step 206, the deployment wizard renders a UI screen that includes selection mechanisms for selecting to configure network devices or to configure a CI cluster from the CI nodes. As an example, there may be a UI button that a user may navigate to (e.g., using a pointing device, keyboard, etc.) that, if pressed, selects to configure network devices, and another button that a user may navigate to and press to select to configure a CI cluster. In one or more embodiments, the selection UI screen may include any other content without departing from the scope of embodiments described herein. For example, the UI screen may include a welcome statement, visual representations of devices in the CI, etc.

In Step 208, a determination is made as to whether the network devices for the CI have already been configured. In one or more embodiments, the network devices must be configured prior to configuration of the CI cluster, including having ports connected to the CI configured with a CI profile, having necessary VLANs configured, having necessary network addresses configured, etc. In one or more embodiments, if the network devices have not yet been so configured, then the user must select to configure the network devices, and the method proceeds to Step 210. If, on the other hand, the network devices have previously been so configured using any other configuration scheme, the user may select to configure the CI cluster, and the method proceeds to FIG. 2B.

In Step 210, the deployment wizard provides the client device information for rendering a series of UI screens to obtain information relating to the network device configuration. In one or more embodiments, one screen in the series of screens requests that the user select whether they want to perform a step by step configuration, or if they want to import network information from a pre-engagement questionnaire (PEQ) file (e.g., a JSON file created using information obtained via a PEQ from the entity seeking to deploy the CI) that was previously completed and that includes some or all of the necessary information to complete the network device configuration. In one or more embodiments, if step by step configuration is selected, then subsequent UI screens may be pre-populated with information that represents suggested configuration choices. In one or more embodiments, if the option to import network information is selected, then subsequent UI screens will be populated, at least in part, with information from the PEQ file. The subsequent UI screens will also include relevant information obtained by the deployment wizard during the discovery process performed in Step 202.

One example of a subsequent screen is a screen that lists each network device discovered during the discovery process, and one or more identifiers and a model number for each device. Other information may be displayed for the user on this screen (or any other screen) without departing from the scope of embodiments described herein. Such a screen may allow the user to view all or any portion of the network devices to be included in the CI, and request a username and password for the selected network devices. In one or more embodiments, in response to receiving a username and password for the selected network devices, the deployment wizard may verify whether the information allows the network device(s) to be accessed, and to display whether or not verification was successful to the user via the UI screen on which the username and password were entered. Another example of a subsequent screen rendered during network device configuration for the CI is a VLAN assignment screen. Such a screen may display suggested VLANs (e.g., five VLANs) and suggested ports to be included in the VLANs as tagged or untagged ports. Alternately, the VLAN assignment screen(s) may be populated, at least in part, using information from the PEQ file. In one or more embodiments, via the UI screens rendered by the deployment wizard, a user may be given the ability to modify or edit all or any portion of the information relevant to network device configuration, such as, for example, VLAN number, VLAN description, port assignments to a VLAN, etc. Another example of a subsequent screen that may be rendered during the network device configuration is a summary screen reflecting the planned network device configuration based on information gained via and/or displayed on the network configuration screens, and any other network device configuration to be performed by the deployment wizard. Such a screen may also indicate whether a validation of the planned network device configuration was successful. One of ordinary skill in the art, having the benefit of this detailed disclosure, will appreciate that any other UI screens for obtaining and/or displaying network device information for use in network device configuration may be used without departing from the scope of embodiments described herein.

In Step 212, network device information obtained by the deployment wizard is added to the CI deployment file to later be used to configure the network devices during deployment of the CI. Once the network device configuration information has been added to the CI deployment file, the method proceeds to FIG. 2B.

Figure 2B:
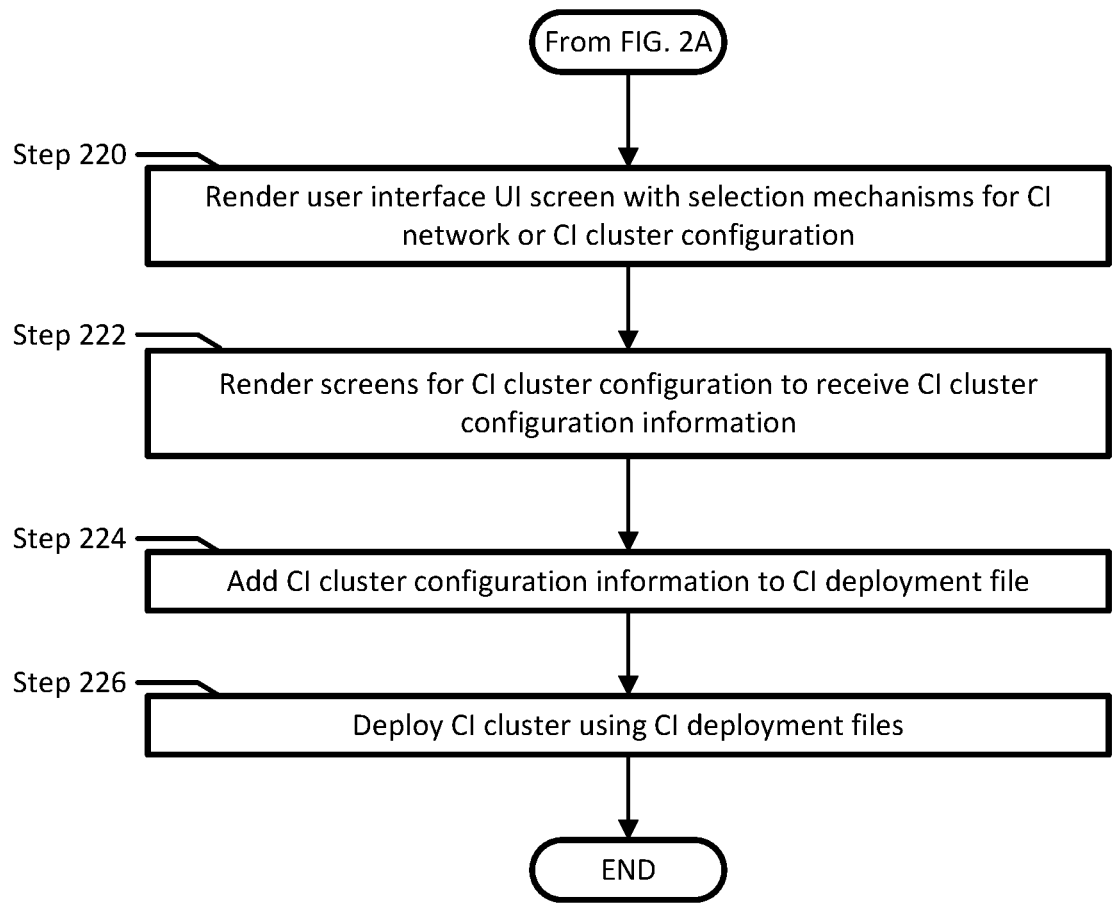
FIG. 2B shows a flowchart in accordance with one or more embodiments of the invention.

FIG. 2B shows a flowchart describing a method for CI deployment in accordance with one or more embodiments disclosed herein.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 220, a screen is rendered for the user that has selection mechanisms for selecting to configure either network devices or a CI cluster. If the network devices were already configured prior to the user accessing the deployment wizard, then this may be the first rendering of the screen to the user, and the user must select to configure the CI cluster to proceed with the deployment. Alternatively, if the network devices were not configured for the CI prior to accessing the deployment wizard, this might be the second rendering of the screen for the user, who has already been through the network device configuration portion of the deployment wizard (see FIG. 2A). The selection screen is discussed in the description of Step 206 of FIG. 2A, above. In either case, the user now uses the selection mechanism for configuring the CI cluster to proceed with the CI deployment.

In Step 222, the deployment wizard provides the client device information for rendering a series of UI screens to obtain information relating to the CI cluster configuration. In one or more embodiments, one screen in the series of screens requests that the user select whether they want to perform a step by step configuration, or if they want to import CI cluster information from a PEQ file (e.g., a JSON file created using information obtained via a PEQ from the entity seeking to deploy the CI) that was previously completed and that includes some or all of the necessary information to complete the CI cluster configuration. In one or more embodiments, if step by step configuration is selected, then subsequent UI screens may be pre-populated with information that represents suggested configuration choices. In one or more embodiments, if the option to import CI cluster information is selected, then subsequent UI screens will be populated, at least in part, with information from the PEQ file. The subsequent UI screens will also include relevant information obtained by the deployment wizard during the discovery process performed in Step 202 for FIG. 2A.

One example of a subsequent screen is a screen that lists each CI node discovered during the discovery process, and one or more identifiers and a model number for each device. Other information may be displayed for the user on this screen (or any other UI screen) without departing from the scope of embodiments described herein. Such a screen may allow the user to all or any portion of the CI nodes to be included in the CI cluster. A user may select all CI nodes discovered, or any portion thereof. In one or more embodiments, if only a portion of the CI nodes are selected, the user may later access the deployment wizard to create one or more additional clusters from the CI nodes that were not selected during the previous CI deployment.

Another example of a subsequent screen rendered during CI cluster configuration for the CI is a virtualization environment manager screen. Such a screen may include a mechanism to select to join the CI cluster to an existing virtualization environment manager, which may or may not be managing other virtualization environments. In one or more embodiments, if a selection is made to join the CI to an existing virtualization environment manager, then the screen may include fields that are populated with relevant information identifying the virtualization environment manager and its access information (e.g., user name and password), which may be populated by the user or may be derived from the PEQ file if one was imported at the start of the CI cluster configuration. In one or more embodiments, if a user wants to use a new virtualization manager for the CI, then the user may be given the opportunity to provide various items of information (or accept suggestions for such information), which may include, but is not limited to, a datacenter name, a cluster name for the CI cluster being configured, a virtualization environment manager password, etc. As with all configuration screens presented by the deployment wizard, all or any portion of the pre-populated information may be editable by the user during the CI cluster configuration. In one or more embodiments, the ability of the deployment wizard to receive information from a virtualization environment manager and/or, during the CI deployment, transmit information to the virtualization environment manager creates a bi-directional communication channel, which may reduce the number of touchpoints (i.e., separate interfaces) that are used for CI deployment, which may reduce potential errors in such deployments.

Another example of a subsequent UI screen presented by the deployment wizard during the CI cluster configuration is one or more UI screens for configuring one or more optional features. In one or more embodiments, an optional feature is one that is not required to be configured for a successful CI deployment, though it may be recommended. In one or more embodiments, one such feature is OOB management for the CI nodes. Instead of a user having to access each CI node independently to configure OOB management, in one or more embodiments, the deployment wizard presents a UI screen that allows the user to configure all the CI nodes by allowing OOB configuration information to be auto-filled, by accepting the OOB management configuration information that was obtained from the PEQ file for the CI cluster, or by entering the information. In one or more embodiments, such information may include, but is not limited to, a starting and ending IP address (i.e., an IP address range) for the OOB management interfaces of the CI nodes, subnet mask(s), gateway address(es), username(s), password(s), plugin information, and physical location information (e.g., datacenter name, aisle name, rack name, room name, etc.).

Another example of a subsequent screen that may be rendered during the CI cluster configuration is a summary screen reflecting a list of CI nodes selected to be part of the cluster, and relevant information about the nodes. Such information may include, but is not limited to, identifiers of the CI nodes, hypervisor hostnames, network addresses, and OOB management addresses. In one or more embodiments, the information for each CI node may also include an order number. In one or more embodiments, an order number reflects an ordering of the CI nodes based on any ordering scheme. For example, the deployment wizard may order the CI nodes from lowest to highest service tag number. In one or more embodiments, the user may change the order number using the edit functionality provided on the summary screen to reflect an order that the user prefers. Examples of preferred ordering schemes include, but are not limited to, top of rack to bottom of rack, bottom of rack to top of rack, etc.

In Step 224, CI cluster configuration information obtained by the deployment wizard is added to the CI deployment file to later be used to configure the CI cluster during deployment of the CI.

In Step 226, the CI is deployed using the CI deployment file. In one or more embodiments, the CI deployment file is used with one or more APIs to configure the network devices, CI nodes, virtualization environment manager, and optional OOB management settings to deploy the CI. The deployment process may include the choices made and/or agreed to by the user during the use of the deployment wizard, as well as any other configuration steps necessary to successfully deploy the CI (e.g., pushing out a CI profile for each network device port connected to the CI). In one or more embodiments, the capability for pushing out network device port profiles from the deployment wizard on a CI node to the relevant switch port eliminates the need for a user to have to access each network device to be included in the CI and enable the appropriate network device port profile for the ports connected to the CI nodes of the CI.

Although not shown in FIG. 2A or FIG. 2B, at various times during the deployment wizard's execution, information that the user has agreed to and/or accepted may be stored (e.g., cached), which may allow a user to pause the deployment and later come back to it, may protect the information in the event some error occurs that causes the deployment to have to stop at some point, etc. Additionally, the CI deployment file generated at the end of the use of the deployment wizard may be made available to provide information for future CI deployments. For example, if a user has ten CI nodes, and only used five of them in a CI cluster during the present deployment, the user may want to configure another CI using a CI cluster with the remaining five CI nodes. In such a scenario, the user may import information from the previous CI deployment file during the network device configuration and/or CI cluster configuration portions of the deployment configuration.

Example Scenario

The following example is for explanatory purposes only and not intended to limit the scope of embodiments described herein. Additionally, while the example shows certain aspects of embodiments described herein, all possible aspects of such embodiments may not be illustrated in this particular example.

Consider a scenario in which a company purchases a hyper-converged infrastructure (HCI) solution that includes ten CI nodes and two network devices in order to have redundancy for the network of the HCI. The network devices are to be used for the CI, but also for general network functionality for a variety of other devices. The ten CI nodes will be connected to ports one through twenty of each network device (i.e., two ports per node). Once the devices are physically installed in an appropriate one or more rack(s) and properly connected to each other and to a power source, an administrator must then configure the HCI. In this scenario, the administrator did not complete a PEQ for a CI cluster, and so does not have any CI cluster PEQ files to import during the HCI configuration. However, the administrator did complete a PEQ for the network devices, and thus has a PEQ file to import during the network device configuration portion of the HCI deployment.

First, the administrator obtains a laptop to be used as a client device that has a supported browser. The administrator opens the browser and enters the IP address of the deployment wizard into the address bar, which accesses the leader deployment wizard for the HCI. The deployment screen displays a welcome page that informs the administrator that they have accessed the deployment wizard, which will guide them through the HCI deployment process.

The network devices have not been configured for the HCI, though they have otherwise been configured for devices connected to ports other than the ports to which the CI nodes are connected. Once the administrator accesses the deployment wizard, the deployment wizard performs a discovery process to obtain relevant hardware information for the network devices and the CI nodes, including what ports of the network devices are actually connected to the CI nodes, and uses the information to generate an initial CI deployment file that will be added to as the administrator navigates through the deployment wizard. On the welcome screen, the administrator navigates to the button to select starting the network device configuration.

Next, the administrator is presented with a screen that lists the two network devices by an ID number and model number, and fields for the administrator to enter the usernames and passwords for the two network devices. Once the administrator enters the usernames and passwords, the screen is updated to display a successful validation that the deployment wizard can access the network devices. The administrator then selects to move forward with the network device configuration. In one or more embodiments, the next screen presented to the user requests that the user select a step by step set up, or to import network device configuration information from a PEQ file. As the administrator has such a file, the administrator selects that option and provides the location of the file, which the deployment wizard uses to obtain network device configuration information.

The deployment wizard then presents a series of screens detailing the network device configuration information obtained from the PEQ file, and gives the administrator the chance to edit the information. The administrator does not choose to edit any of the information, and instead accepts the information on each screen by navigating to the next screen. One of the screens displays the five VLANs that are to be configured by showing the VLAN number and description obtained from the PEQ file. Each VLAN is also shown as having ports 1-20 assigned, as these are the only ports connected to the CI nodes. The remaining ports on the network devices, which are connected to other devices outside the HCI, are not affected by the HCI deployment process.

After all screens have been reviewed by the administrator, a summary page is presented, reflecting the planned HCI network device configuration and an indication that the configuration was successfully validated. Once the administrator reviews this screen, the administrator selects to continue the HCI configuration, which causes the deployment wizard to add the network device configuration information to the CI deployment file.

The deployment wizard then displays the welcome page again, and the administrator uses the appropriate button to select to configure the CI cluster. The first screen of the CI cluster deployment lists the ten CI nodes. The administrator selects five of them to be in a first cluster.

The deployment wizard then presents a series of screens with CI cluster information pre-populated with suggested values for various items of information, such as names, network addresses, etc. for the CI nodes. The administrator does not choose to edit any of the information, and instead accepts the information on each screen by navigating to the next screen. One of the screens requests that the administrator select whether to add the CI cluster to an existing virtualization environment manager, which, in this scenario, is vCenter. The administrator already has a vCenter instance managing other virtualization environments, and therefore elects to use that vCenter. Accordingly, the administrator enters identifying information, a username, and a password for the vCenter instance, as well as information identifying the new cluster (e.g., a chosen cluster name) so that vCenter may prepare for the addition of the new cluster. The administrator is also presented with a screen that allows the user to configure OOB management for the CI nodes. The administrator selects to allow the deployment wizard to autofill the OOB management information.

After all screens have been reviewed by the administrator, a summary page is presented, reflecting the planned HCl cluster configuration and an indication that the configuration was successfully validated. Once the administrator reviews this screen, the administrator selects to continue the HCl configuration, which causes the deployment wizard to add the CI cluster configuration information to the CI deployment file.

At this point, the HCl is ready to be deployed. Therefore, the administrator selects the option for the deployment wizard to perform the deployment of the HCl. In response, the deployment wizard uses necessary APIs and the CI deployment file to deploy the HCl by pushing out CI profiles to ports 1-20 on the network devices, assigning addresses to the ports, configuring required communication protocols for the ports, enabling the ports, adding the VLANs for the ports, providing vCenter with the necessary information to add the CI cluster, configuring the CI nodes with the CI cluster information, including configuring OOB management for the five nodes of the CI cluster, and, finally, validating that the deployment was successful. Once the validation is complete, the HCl solution is ready to be used. Accordingly, the administrator then begins the post deployment tasks of adding the VMs and virtual appliances the company needs to perform the workloads for which the HCl was purchased. In one or more embodiments, now that the administrator has completed a deployment of a HCl including a CI cluster with five of the ten CI nodes purchased by the company, the CI deployment file may be re-used, at least in part, to facilitate deployment of another HCl that includes all or any portion of the remaining five CI nodes as a CI cluster in the HCl.

Figure 3:
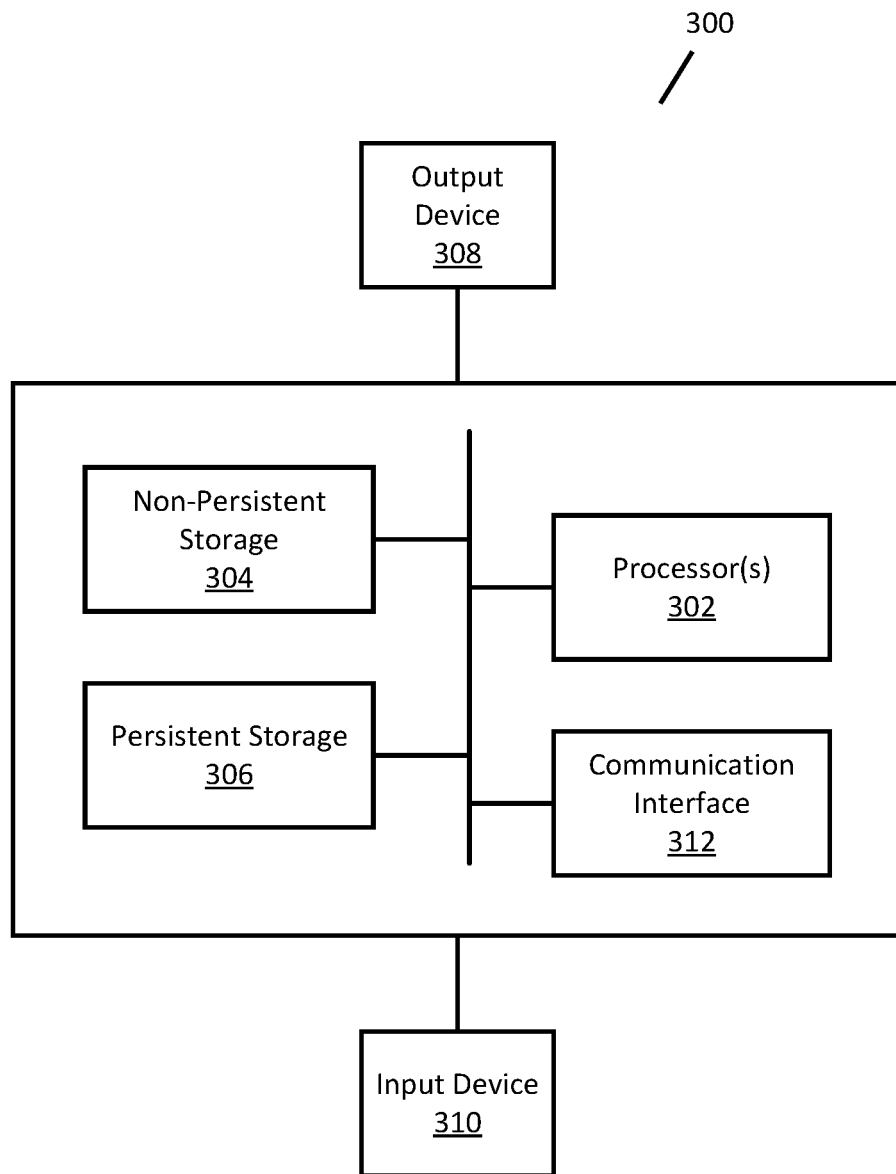
FIG. 3 shows a computing system in accordance with one or more embodiments of the invention.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disc (CD) drive or digital versatile disc (DVD) drive, a flash memory, etc.), a communication interface (312) (e.g., Bluetooth® interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing deployment of a converged infrastructure, the method comprising:
receiving a request to initiate a converged infrastructure (CI) deployment;
obtaining, in response to the request, a CI information set, wherein the CI information set comprises relevant details for a plurality of hardware devices included in the CI deployment, and wherein the plurality of hardware devices includes at least one network device;
creating a CI deployment file using the CI information set;
rendering a deployment user interface (UI) screen comprising a first UI selection mechanism for configuring the at least one network device and a second UI selection mechanism for configuring a CI cluster;
receiving a first user selection via the first UI selection mechanism to configure the at least one network device;
rendering, in response to the receiving the first user selection, a plurality of network device configuration screens to obtain network device configuration information;
adding the network device configuration information to the CI deployment file;

re-rending, after adding the network device configuration information to the CI deployment file, a deployment UI screen comprising the first UI selection mechanism and the second UI selection mechanism;

receiving a second user selection via the second UI selection mechanism to configure the CI cluster;

rendering, in response to the receiving the second user selection, a plurality of CI cluster configuration screens to obtain CI cluster configuration information, wherein a first CI cluster configuration screen of the CI cluster configuration screens comprises a selection of a list of CI nodes, wherein a second CI cluster configuration screen of the CI cluster configuration screens comprises a selection of CI clusters to join an existing virtualization environment, wherein the CI cluster is specified in the selection of CI clusters, and wherein a third CI cluster configuration screen of the CI cluster configuration screens is for configuring optional features of the CI deployment;

adding the CI cluster configuration information to the CI deployment file; and deploying the CI using the CI deployment file.

2. The method of claim 1, wherein at least a portion of the network device configuration information is obtained by importing a pre-engagement questionnaire (PEQ) file.

3. The method of claim 1, wherein at least a portion of the CI cluster configuration information is obtained by importing a pre-engagement questionnaire (PEQ) file.

4. The method of claim 1, further comprising, before deploying the CI:
rendering an out of band management configuration screen to obtain out of band management configuration information; and
adding the out of band management configuration information to the CI deployment file.

5. The method of claim 1, further comprising, before deploying the CI:
performing a validation action set to confirm that the deploying the CI using the CI deployment file will result in a valid CI deployment.

6. The method of claim 1, further comprising, before deploying the CI:
adding additional networking configuration information to the CI deployment file that is not obtained by rendering the plurality of network device configuration screens.

7. The method of claim 1,
wherein deploying the CI comprises configuring a first portion of ports of the at least one network device to be part of the CI, and
wherein a second portion of the ports of the at least one network device is connected to a device that is not part of the CI.

8. The method of claim 1, further comprising:
before adding the network device configuration information to the CI deployment file, storing a plurality of network device information items from each of the plurality of network device configuration screens after acceptance by a user; and
before adding the CI cluster configuration information to the CI deployment file, storing a plurality of CI cluster information items from each of the plurality of CI cluster configuration screens after acceptance by the user.

9. The method of claim 1, further comprising:
performing a subsequent CI deployment, at least in part, using the CI deployment file.

10. A non-transitory computer readable medium comprising computer readable program code, which when executed by a computer processor enables the computer processor to perform a method for managing deployment of a converged infrastructure, the method comprising:
receiving a request to initiate a converged infrastructure (CI) deployment;
obtaining, in response to the request, a CI information set, wherein the CI information set comprises relevant details for a plurality of hardware devices included in the CI deployment, and wherein the plurality of hardware devices includes at least one network device;
creating a CI deployment file using the CI information set;
rendering a deployment user interface (UI) screen comprising a first UI selection mechanism for configuring the at least one network device and a second UI selection mechanism for configuring a CI cluster;
receiving a first user selection via the first UI selection mechanism to configure the at least one network device;
rendering, in response to the receiving the first user selection, a plurality of network device configuration screens to obtain network device configuration information;
adding the network device configuration information to the CI deployment file;
re-rending, after adding the network device configuration information to the CI deployment file, the deployment UI screen comprising the first UI selection mechanism and the second UI selection mechanism;
receiving a second user selection via the second UI selection mechanism to configure the CI cluster;
rendering, in response to the receiving the second user selection, a plurality of CI cluster configuration screens to obtain CI cluster configuration information,
wherein a first CI cluster configuration screen of the CI cluster configuration screens comprises a selection of a list of CI nodes,
wherein a second CI cluster configuration screen of the CI cluster configuration screens comprises a selection of CI clusters to join an existing virtualization environment,
wherein the CI cluster is specified in the selection of CI clusters, and
wherein a third CI cluster configuration screen of the CI cluster configuration screens is for configuring optional features of the CI deployment;
adding the CI cluster configuration information to the CI deployment file; and
deploying the CI using the CI deployment file.

11. The non-transitory computer readable medium of claim 10, wherein at least a portion of the network device configuration information is obtained by importing a pre-engagement questionnaire (PEQ) file.

12. The non-transitory computer readable medium of claim 10, wherein at least a portion of the CI cluster configuration information is obtained by importing a pre-engagement questionnaire (PEQ) file.

13. The non-transitory computer readable medium of claim 10, wherein the method performed by execution of the computer readable program code further comprises, before deploying the CI:
rendering an out of band management configuration screen to obtain out of band management configuration information; and adding the out of band management configuration information to the CI deployment file.

14. The non-transitory computer readable medium of claim 10, wherein the method performed by execution of the computer readable program code further comprises, before deploying the CI:

performing a validation action set to confirm that the deploying the CI using the CI deployment file will result in a valid CI deployment.

15. The non-transitory computer readable medium of claim 10, wherein the method performed by execution of the computer readable program code further comprises, before deploying the CI:

adding additional networking configuration information to the CI deployment file that is not obtained by rendering the plurality of network device configuration screens.

16. The non-transitory computer readable medium of claim 10, wherein deploying the CI comprises configuring a first portion of ports of the at least one network device to be part of the CI, and wherein a second portion of the ports of the at least one network device is connected to a device that is not part of the CI.

17. The non-transitory computer readable medium of claim 10, wherein the method performed by execution of the computer readable program code further comprises, before deploying the CI:

before adding the network device configuration information to the CI deployment file, storing a plurality of network device information items from each of the plurality of network device configuration screens after acceptance by a user; and before adding the CI cluster configuration information to the CI deployment file, storing a plurality of CI cluster information items from each of the plurality of CI cluster configuration screens after acceptance by the user.

18. The non-transitory computer readable medium of claim 10, wherein the method performed by execution of the computer readable program code further comprises, before deploying the CI:

performing a subsequent CI deployment, at least in part, using the CI deployment file.

19. A system for managing deployment of a converged infrastructure, the system comprising:

a converged infrastructure (CI) node operatively connected to a network device and a CI deployment client device, and comprising a processor, memory, a storage device; and a deployment wizard, executing on the CI node, and configured to:

receive, from the CI deployment client device, a request to initiate a converged infrastructure (CI) deployment;

obtain, in response to the request, a CI information set, wherein the CI information set comprises relevant details for a plurality of hardware devices included in the CI deployment, and wherein the plurality of hardware devices includes the network device;

create a CI deployment file using the CI information set;

render a deployment user interface (UI) screen comprising a first UI selection mechanism for configuring the network device and a second UI selection mechanism for configuring a CI cluster;

receive a first user selection via the first UI selection mechanism to configure the network device;

render, in response to the receiving the first user selection, a plurality of network device configuration screens to obtain network device configuration information;

add the network device configuration information to the CI deployment file;

re-render, after adding the network device configuration information to the CI deployment file, the deployment UI screen comprising the first UI selection mechanism and the second UI selection mechanism;

receive a second user selection via the second UI selection mechanism to configure the CI cluster;

render, in response to the receiving the second user selection, a plurality of CI cluster configuration screens to obtain CI cluster configuration information, wherein a first CI cluster configuration screen of the CI cluster configuration screens comprises a selection of a list of CI nodes, wherein a second CI cluster configuration screen of the CI cluster configuration screens comprises a selection of CI clusters to join an existing virtualization environment, wherein the CI cluster is specified in the selection of CI clusters, and wherein a third CI cluster configuration screen of the CI cluster configuration screens is for configuring optional features of the CI deployment;

add the CI cluster configuration information to the CI deployment file; and deploy the CI using the CI deployment file.

20. The system of claim 19, wherein to deploy the CI, the deployment wizard is configured to configure a first portion of ports of the network device to be part of the CI, and wherein a second portion of the ports of the network device is connected to a device that is not part of the CI.

* * * * *